US008553841B2

(12) United States Patent
Cooley et al.

(10) Patent No.: US 8,553,841 B2
(45) Date of Patent: Oct. 8, 2013

(54) COMPACT, LOW NOISE POWER SUPPLY FOR ADVANCED ELECTRONICS APPLICATIONS, AND X-RAY ANALYZER APPLICATIONS THEREOF

(75) Inventors: Ernest Cooley, Rochester, NY (US);
Sony Cheriyan, Jersey City, NJ (US);
Daniel Dunham, Averill Park, NY (US);
Igor Ponomarev, Albany, NY (US);
Paul Quantock, Stillwater, NY (US);
Robert C. Tatar, Saratoga Springs, NY (US)

(73) Assignee: X-Ray Optical Systems, Inc., East Greenbush, NY (US)

( * ) Notice: Subject to any disclaimer, the term of this patent is extended or adjusted under 35 U.S.C. 154(b) by 225 days.

(21) Appl. No.: 13/190,556

(22) Filed: Jul. 26, 2011

(65) Prior Publication Data

US 2012/0020463 A1    Jan. 26, 2012

Related U.S. Application Data

(60) Provisional application No. 61/367,656, filed on Jul. 26, 2010.

(51) Int. Cl.
*H05G 1/32* (2006.01)
*H05G 1/14* (2006.01)
*H01J 35/02* (2006.01)

(52) U.S. Cl.
USPC ............................ 378/107; 378/112; 378/142

(58) Field of Classification Search
USPC ........... 378/91, 101, 102, 104, 111, 112, 119, 378/121, 142, 204, 210; 323/355, 361, 371, 323/911; 363/13, 15–54, 56.05, 56.11, 59, 363/60, 144; 307/12, 89–91, 150, 151, 153, 307/157, 400
See application file for complete search history.

(56) References Cited

U.S. PATENT DOCUMENTS

| | | | |
|---|---|---|---|
| 4,292,592 | A | 9/1981 | Birdwell et al. |
| 5,121,314 | A | 6/1992 | Cathell et al. |
| 5,210,780 | A | 5/1993 | Schweighofer et al. |

(Continued)

OTHER PUBLICATIONS

Cooley et al., Notification Concerning Transmittal of International Preliminary Report on Patentability (Chapter 1 of the Patent Cooperation Treaty), and Written Opinion of the International Searching Authority for PCT/US2011/045279, dated Feb. 17, 2012.

(Continued)

*Primary Examiner* — Anastasia Midkiff
(74) *Attorney, Agent, or Firm* — Jeff Klembczyk, Esq.; Kevin P. Radigan, Esq.; Heslin Rothenberg Farley & Mesiti P.C.

(57) ABSTRACT

A shielded, low-noise, high-voltage power supply having a plurality of voltage multipliers, each having a toroidal transformer, and collectively producing a high DC output voltage from an AC voltage. A main conductor carries the AC voltage, and is positioned proximate each toroidal transformer of the plurality of voltage multipliers. A conductive shell is conductively connected to the main conductor, and substantially encloses the plurality of voltage multipliers and the main conductor, the conductive shell providing a return path for the AC voltage in the main conductor and providing EMI shielding of the voltage multipliers and the main conductor. Other features are provided, including an intermediate transformer for conditioning/isolating the AC voltages.

13 Claims, 6 Drawing Sheets

(56) References Cited

U.S. PATENT DOCUMENTS

| | | | |
|---|---|---|---|
| 6,205,200 B1 * | 3/2001 | Boyer et al. | 378/101 |
| 6,798,863 B2 * | 9/2004 | Sato | 378/46 |
| 6,967,559 B2 | 11/2005 | Beland | |
| 7,400,708 B2 | 7/2008 | Takahashi et al. | |
| 7,448,801 B2 * | 11/2008 | Oettinger et al. | 378/203 |

OTHER PUBLICATIONS

Notification of Transmittal of the International Search Report and the Written Opinion of PCT/US2011/045279 (PCT Publication No. WO 2012/018601), dated Feb. 17, 2012.

* cited by examiner

COMPACT, LOW NOISE POWER SUPPLY FOR ADVANCED ELECTRONICS APPLICATIONS, AND X-RAY ANALYZER APPLICATIONS THEREOF

CROSS-REFERENCE TO RELATED PATENT APPLICATION

This application claims the benefit of U.S. provisional patent application Ser. No. 61/367,656, filed Jul. 26, 2010, which is hereby incorporated herein by reference in its entirety.

TECHNICAL FIELD

The present invention relates in general to power supplies. More particularly, the present invention relates to a compact, low noise power supply for powering components in a compact environment near other EMI sensitive components.

BACKGROUND OF THE INVENTION

Providing direct current (DC) power to components in sensitive, high power instruments remains a significant challenge. Power requirements for certain components can be very high, even in compact instruments. Other co-located components may be highly sensitive to excessive levels of electromagnetic interference (EMI) from the power supply in such compact instruments.

For example, x-ray spectroscopy instruments often include x-ray sources which require high DC level inputs (e.g., 40 kV or more); and also include other co-located components (e.g., detectors) and x-ray beam paths, which can be very sensitive to power supply EMI.

What is required, therefore, is an improved, compact DC power supply, which can convert typical AC or DC power sources to 40 kV DC or more, with great stability and predictability, and with minimal EMI impact on other components (e.g., detectors).

SUMMARY OF THE INVENTION

The shortcomings of the prior art are overcome and additional advantages are provided by the present invention which in one aspect is a shielded, low-noise, high-voltage power supply having a plurality of voltage multipliers, each having a toroidal transformer, and collectively producing a high DC output voltage from an AC voltage. A main conductor carries the AC voltage, and is positioned proximate each toroidal transformer of the plurality of voltage multipliers. A conductive shell is conductively connected to the main conductor, and substantially encloses the plurality of voltage multipliers and the main conductor, the conductive shell providing a return path for the AC voltage in the main conductor and providing EMI shielding of the voltage multipliers and the main conductor.

An insulating potting material may surround the main conductor and the voltage multipliers; and the main conductor may be an unsheathed conductor.

An AC drive circuit may be provided for producing the AC voltage, along with an intermediate transformer, positioned between the AC drive circuit and the main conductor, for conditioning the AC voltage prior to its application to the main conductor, and for isolating the main conductor from the AC drive circuit.

The intermediate transformer may be positioned on a board forming part of the conductive shell, and proximate one end of the main conductor.

The conductive shell may be grounded; may comprise an exterior housing of the power supply; and/or may comprise a layer positioned inside of an exterior housing of the power supply.

The power supply of the present invention may be particularly useful in x-ray analyzer applications, with x-ray excitation and/or detection paths and/or detectors, which may require shielding from power supply components.

Further additional features and advantages are realized through the techniques of the present invention. Other embodiments and aspects of the invention are described in detail herein and are considered a part of the claimed invention.

BRIEF DESCRIPTION OF THE DRAWINGS

The subject matter regarded as the invention is particularly pointed out and distinctly claimed in the claims at the conclusion of the specification. The foregoing and other objects, features, and advantages of the invention are apparent from the following detailed description taken in connection with the accompanying drawings in which:

FIG. 4a is a perspective view of a voltage multiplier stage;

FIG. 4b is a schematic view of the voltage multiplier stage of FIG. 4a;

DETAILED DESCRIPTION OF THE INVENTION

Figure 1:
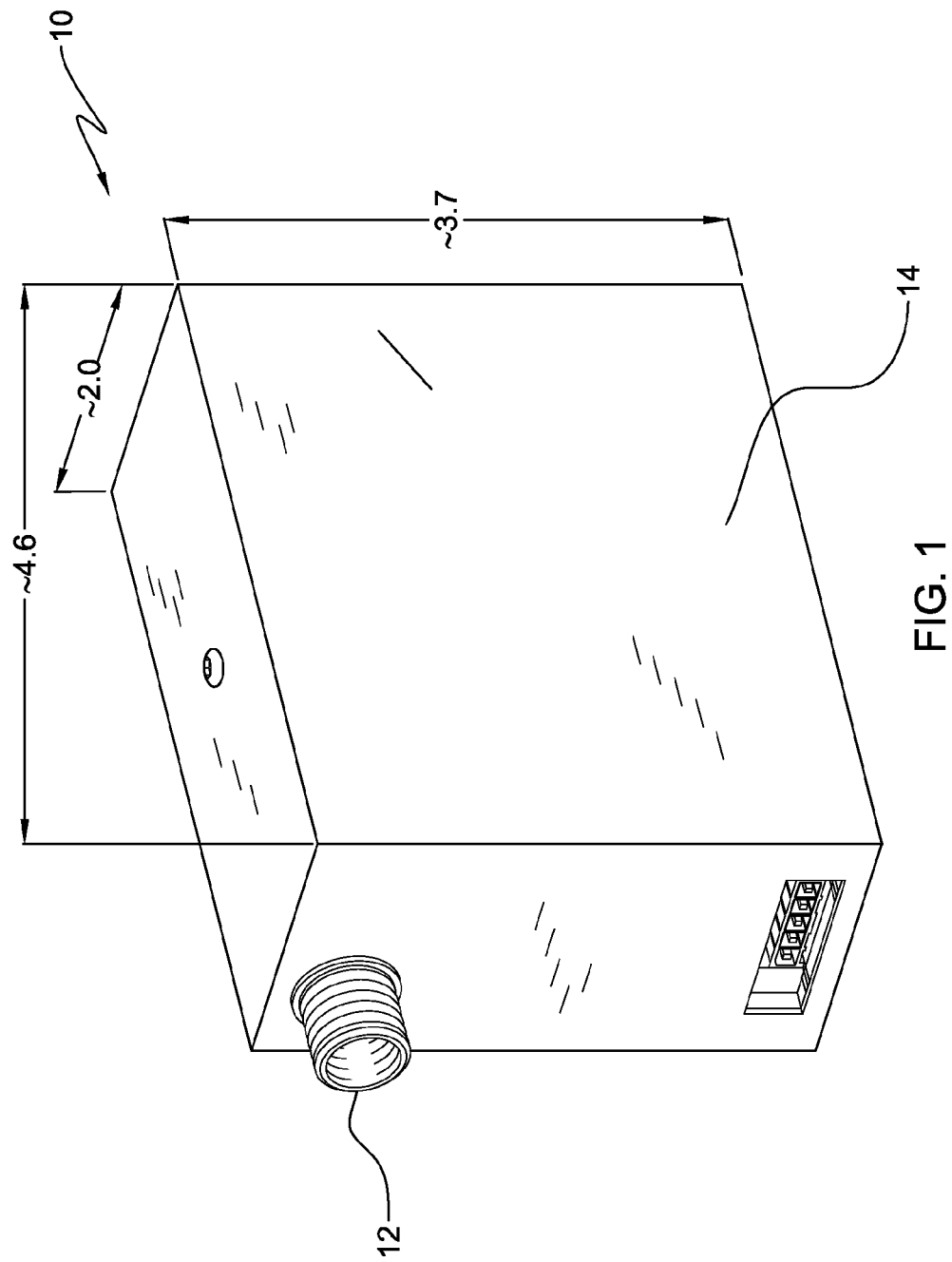
FIG. 1 is a perspective view of a compact, low noise DC power supply in accordance with one aspect of the present invention.

X-ray analysis of samples is a growing area of interest across many industries such as medical, pharmaceutical, consumer products, and petroleum. Small, compact x-ray tubes have experienced widespread adoption in x-ray fluorescence (XRF) spectroscopy and x-ray diffraction (XRD) instruments, for a wide range of industrial measurement and other applications.

U.S. Pat. Nos. 6,934,359 and 7,072,439, which are hereby incorporated by reference herein in their entirety and assigned to X-Ray Optical Systems, Inc., the assignee of the present invention, disclose monochromatic wavelength dispersive x-ray fluorescence (MWD XRF) techniques and systems for the analysis of liquid samples. As one particular example, these patents disclose techniques for the determination of the level of sulfur in petroleum fuels, and a commercialized x-ray analyzer (SINDIE) is now in widespread use for this measurement at petroleum refining, pipeline, and terminal facilities. Other toxic analytes are also attracting close attention recently such as lead, cadmium, and antimony—and these analytes are particularly suited to detection and quantification using x-ray techniques because of their unique and detectable fluorescence responses to incident x-rays.

The ability to provide acceptable levels of detection and quantification depends in part on the fluorescence detector technology. High performance x-ray detectors can be particularly sensitive to EMI, therefore, analyzer performance can be compromised significantly by operating detectors in the presence of EMI from, e.g., a noisy power supply.

In addition, the ability to provide an efficient, economical, portable analysis capability in such instruments also depends to a large extent upon x-ray tube and optic technology. In that regard, certain tube and optic technology can be combined for smaller, portable systems, e.g., a compact, electron-bombardment x-ray tube coupled to x-ray optics for providing highly controlled x-ray energies, and beam paths. One type of x-ray tube is available from Oxford Instruments—model #5011, which operates at less than 100 watts (i.e., 75 watts) at a cost of about $1500 per tube, in contrast to higher-power, laboratory sources which can cost many thousands, or hundreds of thousands of dollars—which is cost prohibitive for many compact applications. Another example is the Varian VF-50J (similar to that depicted here), tubular in shape, and which operates at 50 watts or less, at a cost of about several thousand dollars each.

To generate x-rays at the appropriate energy, these tubes still require significant input anode voltages of 50 kV DC. Other tubes for higher x-ray energies require even higher voltages.

X-ray tubes conventionally emit radiation in a divergent manner. In the past, obtaining an illumination spot size of sufficient intensity on a small sample area typically necessitated increasing the power supplied to expensive, high-powered tubes or other sources. The ability to focus x-ray radiation to smaller spots with higher intensities, using focusing x-ray optics, has enabled reductions in the size and cost of x-ray tubes, and x-ray systems have therefore been proliferating beyond the laboratory to in-situ, field uses. The above-incorporated U.S. Pat. Nos. 6,934,359 and 7,072,439 disclose monochromatic wavelength dispersive x-ray fluorescence (MWD XRF) techniques and systems, using doubly curved crystal optics in the excitation and/or detection paths. The x-ray optic-enabled systems described in these patents have enjoyed widespread success beyond the laboratory for measuring sulfur in petroleum fuels in a variety of refinery, terminal, and pipeline environments.

In such systems, precise optic alignment along an axis defined by a source and sample spot may be required, as illustrated in commonly-assigned U.S. Pat. No. 7,035,374, which is hereby incorporated by reference in its entirety. This patent proposes an arrangement of curved, monochromating optics around a central axis operating according to Bragg diffraction conditions—the Bragg angle for crystal optics determines their diffractive effect. Each individual optic crystal can in one example be fabricated according to the method disclosed in commonly assigned U.S. Pat. No. 6,285,506, entitled "Curved Optical Device and Method of Fabrication," which is hereby incorporated by reference herein in its entirety. All individual crystals should be aligned to the source-to-target axis, for proper Bragg conditions. Improvement in optic alignment and stability in operation, especially for such multiple-crystal optics, therefore remains an important area of interest.

Various optic/source combinations have been previously proposed to handle other types of thermal stability, beam stability, and alignment issues, such as those disclosed in commonly assigned U.S. Pat. Nos. 7,110,506; 7,209,545; and 7,257,193. Each of these patents is also hereby incorporated by reference herein in its entirety. In particular, U.S. Pat. No. 7,209,545 (entitled "X-Ray Source Assembly Having Enhanced Output Stability, and Fluid Stream Analysis Applications Thereof") and U.S. Pat. No. 7,257,193 (entitled "X-Ray Source Assembly Having Enhanced Output Stability Using Tube Power Adjustments and Remote Calibration") address certain tube/optic alignment problems during source operation with real-time, corrective feedback approaches for alignment between the tube focal spot, optic, and output focal spot.

Tube-optic-target-optic-detector alignment therefore remains an important design criteria, especially for small source, lower cost, volume-manufactured "in the field" systems requiring precise alignment, ideally accomplished at the factory with no further need to re-align in the field.

The excitation and/or detection x-ray paths are spatially controlled by the optics, and in x-ray energy levels, to provide the requisite analytical results. Spatial forming of x-ray beams using electromagnetic energy has been proposed in certain unique instruments. Conversely, unintentional EMI from, e.g., a power supply having excessive levels of noise, could have an undesirable affect on the integrity of these controlled x-ray paths. The above-noted x-ray source stability approaches address thermal and/or mechanical stability, but do not address areas of instability due to EMI factors.

In accordance with the present invention, and with reference to FIG. 1, a compact, low noise DC (direct current) power supply 10 is depicted having a high voltage output connector 12 and a shielding, within a conductive exterior housing or shell 14. As discussed further below, and in accordance with the present invention, the shielded exterior housing or shell 14 forms an integral part of the power supply circuitry (e.g., main conductor return). Exemplary dimensions (in inches) are shown, which convey the relatively small size of this power supply.

In one embodiment, this supply is driven by a standard off-the-shelf DC supply providing a DC voltage (e.g., 24V), and provides a stepped up voltage (e.g., 40 kV) in accordance with voltage multiplication techniques discussed further below.

Figure 2B:
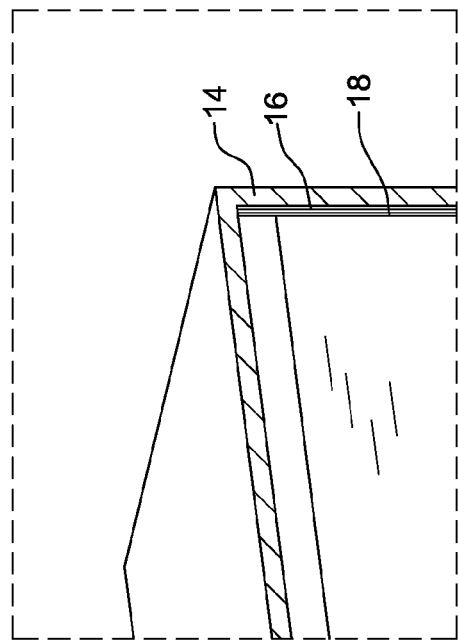
FIG. 2b is an inset view of a portion of the power supply of FIG. 2a showing additional detail thereof.
Figure 2A:
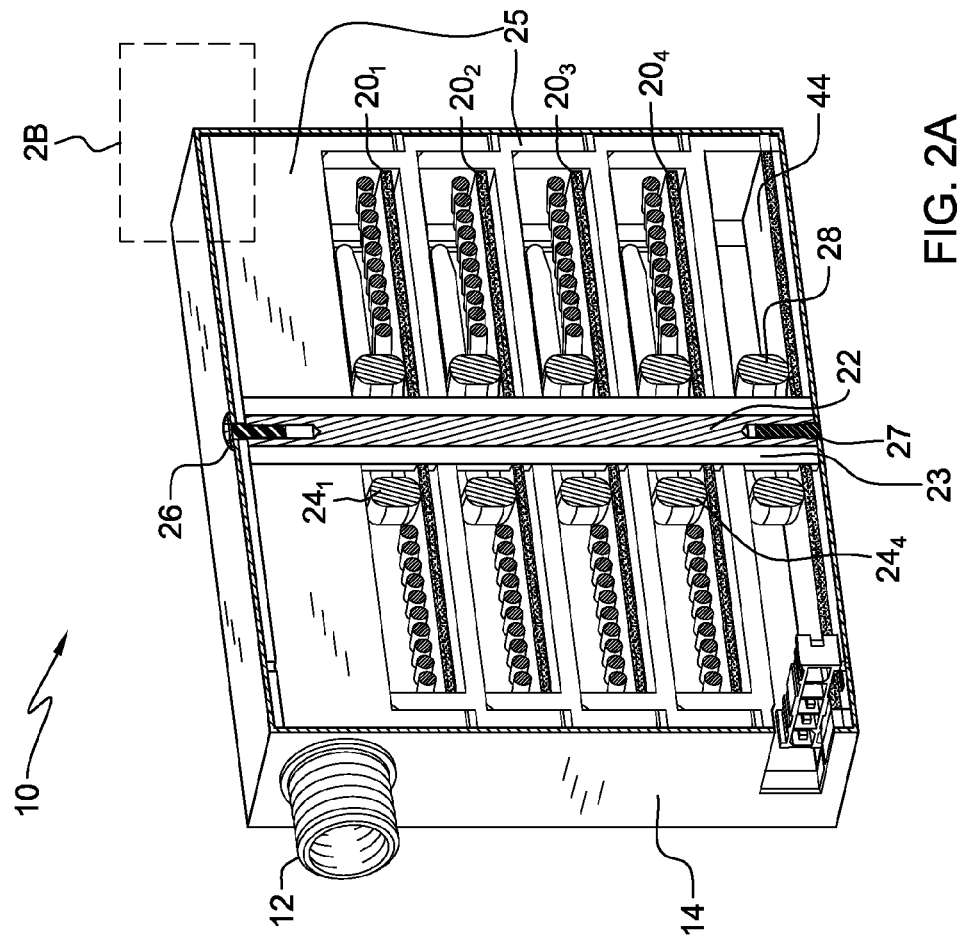
FIG. 2a is sectional view of the power supply of FIG. 1.

FIG. 2a is a sectional view showing various components of exemplary power supply 10 of FIG. 1 in accordance with the present invention. Voltage multiplier boards $20_1 \ldots 20_4$ (discussed further below) are shown stacked vertically, and connected in series, each having a respective toroidal transformer $24_1 \ldots 24_4$.

Insulation between the boards can also be implemented in this embodiment using an insulating dielectric material 25, which may also support the boards structurally in an interlocking fashion as shown. (This dielectric insulation may be omitted in favor of a liquid or potting material, as discussed below in connection with FIG. 3.)

A main conductor 22, with optional sheathing 23, carrying an alternating current (discussed further below) is placed e.g., centrally within housing 14 and passes through each of the toroidal transformers of the multiplier boards. Conductor 22 may be driven by at least one toroidal transformer 28 formed by an "intermediate transformer" 44, or may be direct-driven, as discussed further below.

Main conductor 22 may have certain exemplary features in accordance with the present invention as follows:

(i) Conductor 22 may be relatively thick (e.g., ¼ inches in diameter) thereby offering greater surface area and therefore less resistance based on its larger surface external surface area. Also, by increasing the diameter of the conductor, field line intensity is spread out which reduces the chances of "arcing" between the grounded conductor and nearby high voltages on the multiplier boards.

Figure 3:
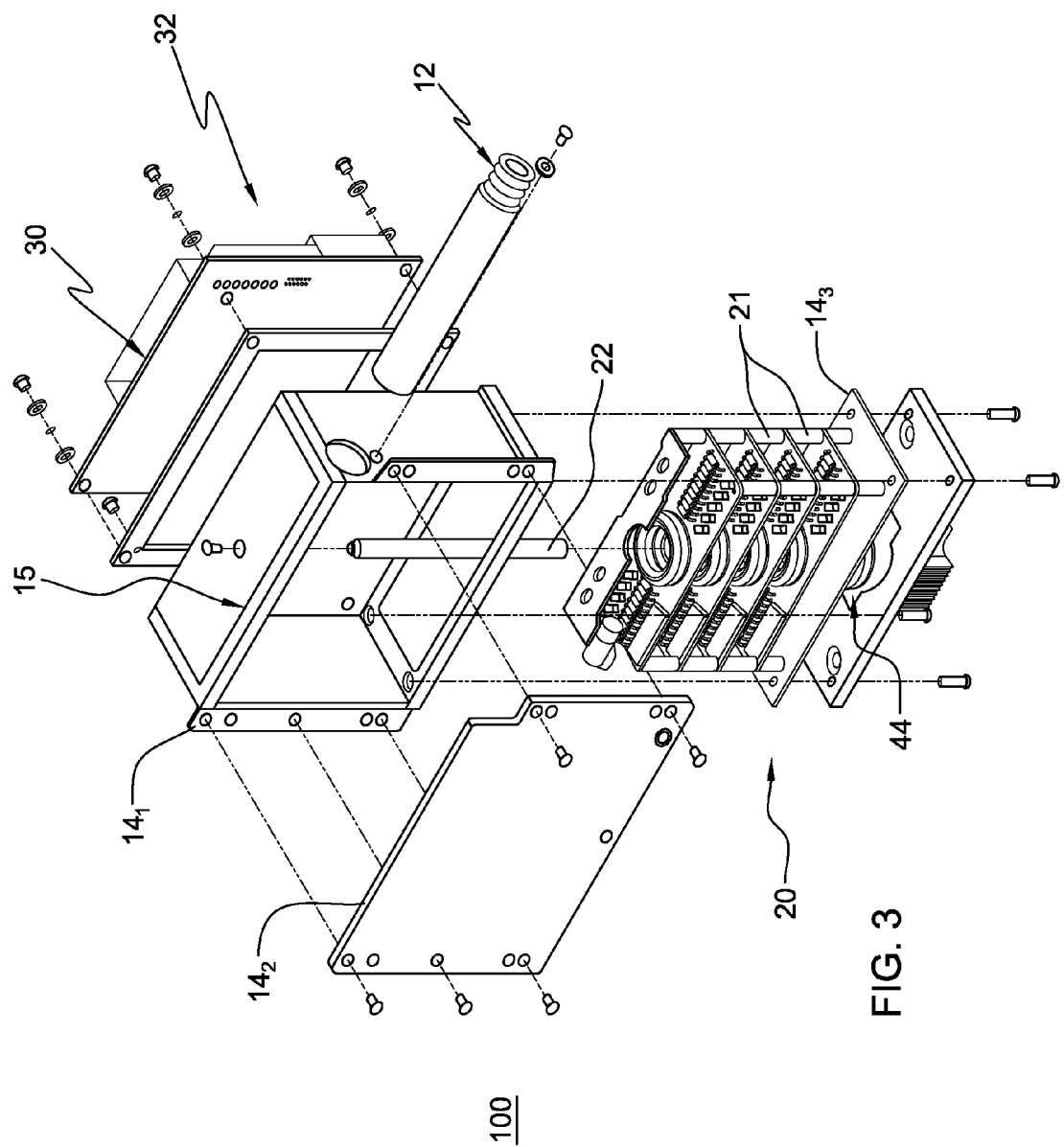
FIG. 3 is an exploded view of various components of a power supply similar to that of FIGS. 1-2, in accordance with aspects of the present invention.

(ii) Conductor 22 may be unsheathed (thereby omitting sheath 23 as shown in FIG. 3). This lack of sheathing provides a matching of the dielectric constant to any insulating compound (potting, etc.) that may be placed around the conductor to insulate the conductor from the high voltages on the voltage multiplier boards. By omitting another layer of sheathing on the conductor, the dielectric constant between the conductor and the potting is essentially matched, thereby decreasing the chance of arcing.

(iii) Conductor 22 may be insulated using the same insulation potting (e.g., oil, silicon, etc.) filling the remainder of housing 14 (e.g., around the multiplier boards 20, etc.).

(iv) Direct, easy attachment. In the embodiment shown, main conductor 22 is conductively attached to conductive exterior housing or shell 14 at, e.g., points 26 and 27, which provides both a return path for the AC signal carried through conductor 22, and shielding for the entire assembly.

The inset view of FIG. 2b shows additional, exemplary detail of one embodiment of an exemplary exterior housing. Exterior housing 14 can be formed of an electrically conductive material (e.g., aluminum or copper). An inner conductive shield 18 can also be provided (e.g., copper), separated from outer housing 14 by an insulating layer 16 (e.g., kapton). Therefore, the outer conductive shielding/return path can comprise the outer housing 14 (if conductive), and/or another inner conducting layer 18. If another inner layer is conducting, the outer housing can be formed of a non-conductive material.

The present invention contemplates any conductive material forming all, or substantially all, of a conductive "shell" enclosing components of the power supply, including a conductive exterior housing 14 as shown, a conductive layer 18 of FIG. 2b, or both, or any similar techniques providing a return path for central AC conductor 22, and simultaneous shielding for all or substantially all of the components inside of the shell. The combination of conductor 22 and outer shell, emulates a "coaxial" transmission line providing relatively low noise outside of the shell. Any implementation of shell 14 providing the shielding and return path will fall within the scope of the present invention, including implementations which do not enclose all power supply components, and/or implementations which involve the use of any type of conductive materials.

The exploded view of FIG. 3 (where like reference numerals are used to refer to like elements) provides additional detail of another embodiment of a power supply 100 in accordance with certain aspects of the present invention. Outer conductive housing or shell 14 may comprise conductive sections $14_1 \ldots 14_3$, conductively affixed together with, e.g., screws or other suitable fastening mechanisms. Gasket material 15, e.g., copper taper, can also be used along joints to ensure continuous conductive connections between sections.

Section $14_3$ may include additional circuitry placed thereon, e.g., an intermediate transformer 44 (discussed further below) which applies a conditioned voltage directly to conductor 22. This allows precise control of the input waveform (at, e.g., 150 kHz) which aids in overall noise reduction.

Also shown in FIG. 3 in accordance with the present invention, is a control board 30, integrally formed with housing 14. Control board 30 comprises a connector 32 for, e.g., DC power input, control input, monitor output. Near the bottom of this board (not shown) an AC drive connector is provided to supply the 150 kHz AC voltage to the primary board/intermediate transformer 44.

A liquid, insulating potting material (e.g., silicone, not shown) can be used internal to shell 14, surrounding all boards 20 and conductor 22, which can remain unsheathed as shown. This lack of sheathing provides a matching of the dielectric constant to any insulating compound (potting, etc.) that may be placed around the conductor to insulate the conductor from the high voltages on the voltage multiplier boards FIG. 4a shows a single voltage multiplier board 20, including passive components, e.g., resistors, diodes, capacitors, an inductive transformer 24 (e.g., a toroidal transformer in this example), and posts 21 for series conductive and/or physically supportive connections to adjacent boards.

Figures 4A, 4B:
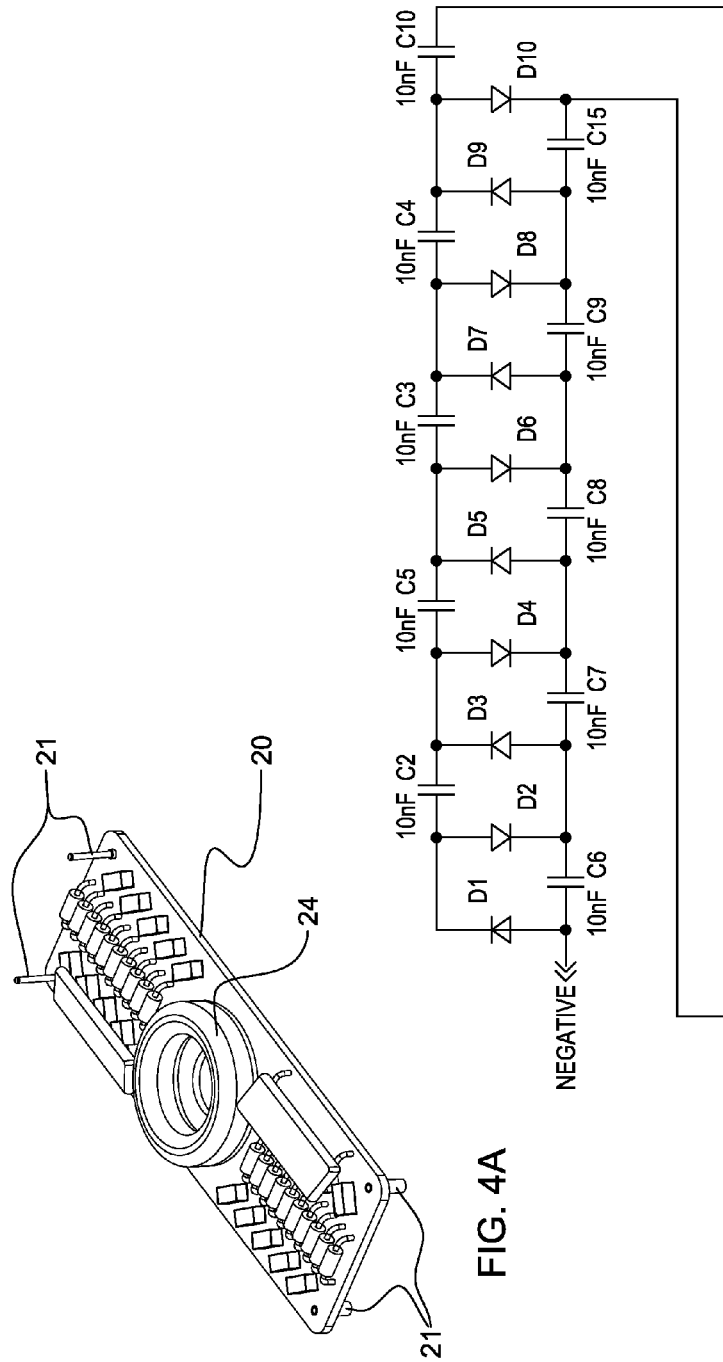

An exemplary schematic of board 20 is shown in FIG. 4b. In general, an alternating current is induced in inductive transformer 24 (e.g., toroid) by an alternating current (e.g., 150 kHz, 24 VAC) in main conductor 22 (not shown) positioned within the toroid. This induced AC current is rectified using suitable rectification circuitry, in this case a ladder network of diodes and capacitors. The output DC voltage for this configuration, using the input voltage defined above, can be approximately 10 kV. Therefore, a series connection of 4 such multiplier boards (e.g., FIGS. 1-3) can generate a high DC output voltage of 40 kV, adequate to drive high voltage components including the types of x-ray tubes discussed above (e.g., Oxford, Varian).

Figure 5:
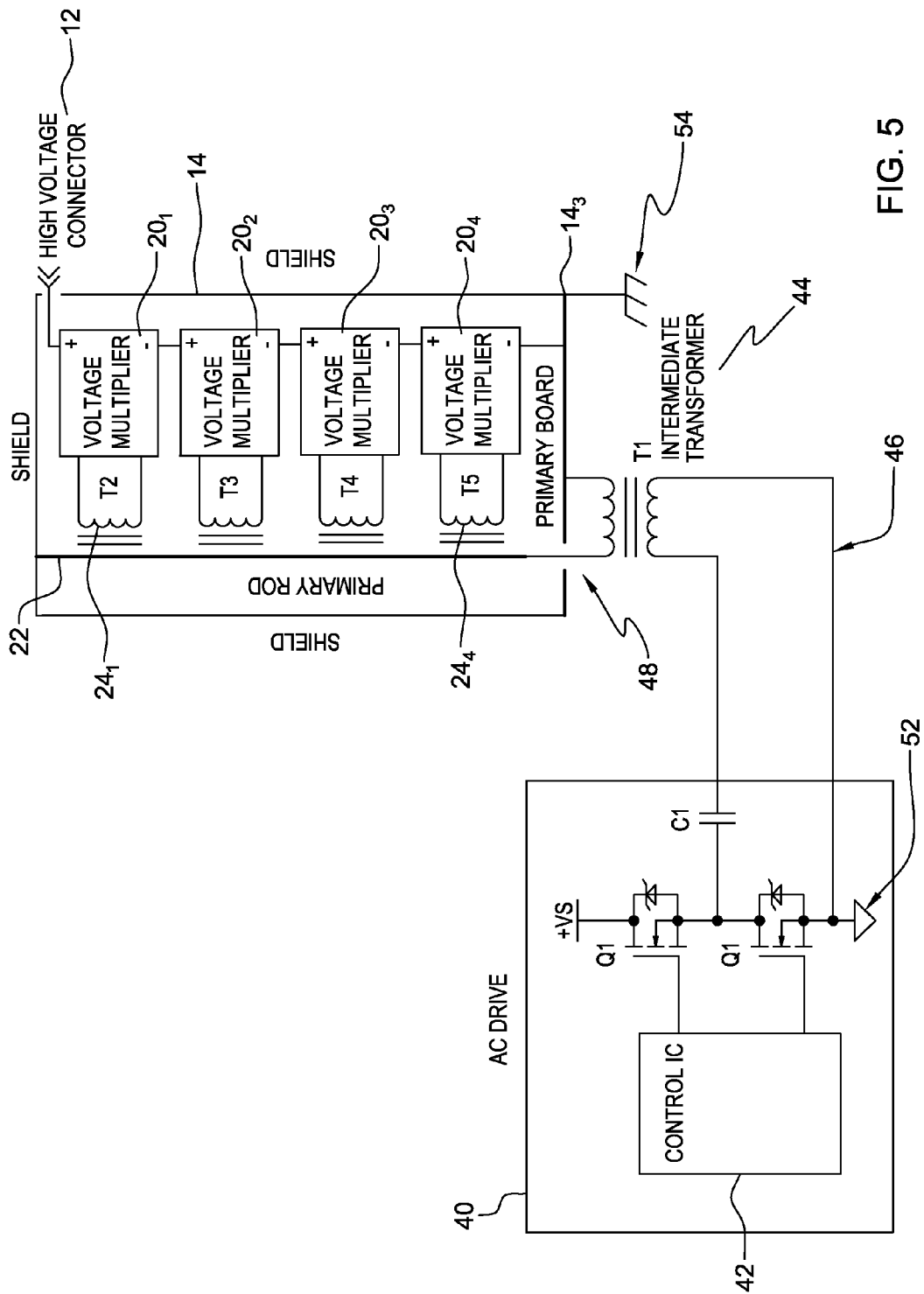
FIG. 5 is a schematic view of the functional components of a power supply in accordance with an aspect of the present invention.

FIG. 5 is a schematic view of the functional components of a power supply in accordance with certain aspects of the present invention, including an AC drive circuit 40 (on, e.g., board 30 discussed above), and an associated control IC 42 (also on board 30), for producing an AC drive voltage 46 based on a low input DC voltage+VS (e.g., 24V DC). In accordance with one aspect of the present invention, an intermediate transformer 44 may be provided (e.g., on board $14_3$) for isolating/decoupling AC voltage 46 from AC voltage 48 applied to main conductor 22. These waveforms may be approximately equivalent in frequency and voltage, however, this intermediate transformer 44 (driving conductor 22 either directly by trace along board $14_3$ or, in another embodiment, by inductive toroid as shown in FIG. 2a) offers certain advantages as follows. Transformer 44 can be implemented on board $14_3$, and coupled directly or inductively to main conductor 22, providing precise control of geometry and therefore noise characteristics. (Though in general, this transformer may be implemented inside of shell 14 (see FIG. 2a) or outside of shell 14 on board 30.) In another embodiment, a separate pot-core inductor can be added in series (say L1, not shown) between transformers C1 and T1, to optimize system resonance. L1 inductance can be adjusted by changing the number of turns or adjusting the gap on the pot-core. The use of 2 separate self-shielding pot-cores for L1 and T1 may further accomplish the goal of low noise and high efficiency. A custom integrated magnetic component could combine L1 and T1 in a single package of smaller overall size and weight.

This transformer also provides some level of control of the impedance matching of the AC drive voltage source, without the need to adjust the individual toroids 24 on the multiplier boards 20. This transformer also allows a resonant, sinusoidal "ringing" of a relatively clean waveform within main conductor 22. This also allows higher frequencies (e.g., 200 kHz or more) to be used, which results in the potential of using smaller components (e.g., smaller toroids and capacitors). Finally, this intermediate transformer can be used to isolate AC supply ground 52 from "shell" ground 54. This provides the important advantage that noise from other components external to this power supply (e.g., AC drive grounds, and all other components sharing these grounds in an analyzer) are confined to those components and do not affect operation of the power supply, and conversely, also protects those external analyzer components (e.g., detector) from noise generated within the power supply.

Ground 54 can also be tied directly to an analyzer chassis. Other off-the-shelf power supplies sometimes require floating/isolation from system grounds for proper operation.

As discussed above, waveform 48 is applied to main conductor 22, having a return through grounded exterior housing 14 (or other conductive "shell" as discussed above) which also provides an EMI quieting effect for all components within the shell. The four series-connected multipliers 20 provide an output DC voltage (e.g., 40 kV) on connector 12.

Figure 6:
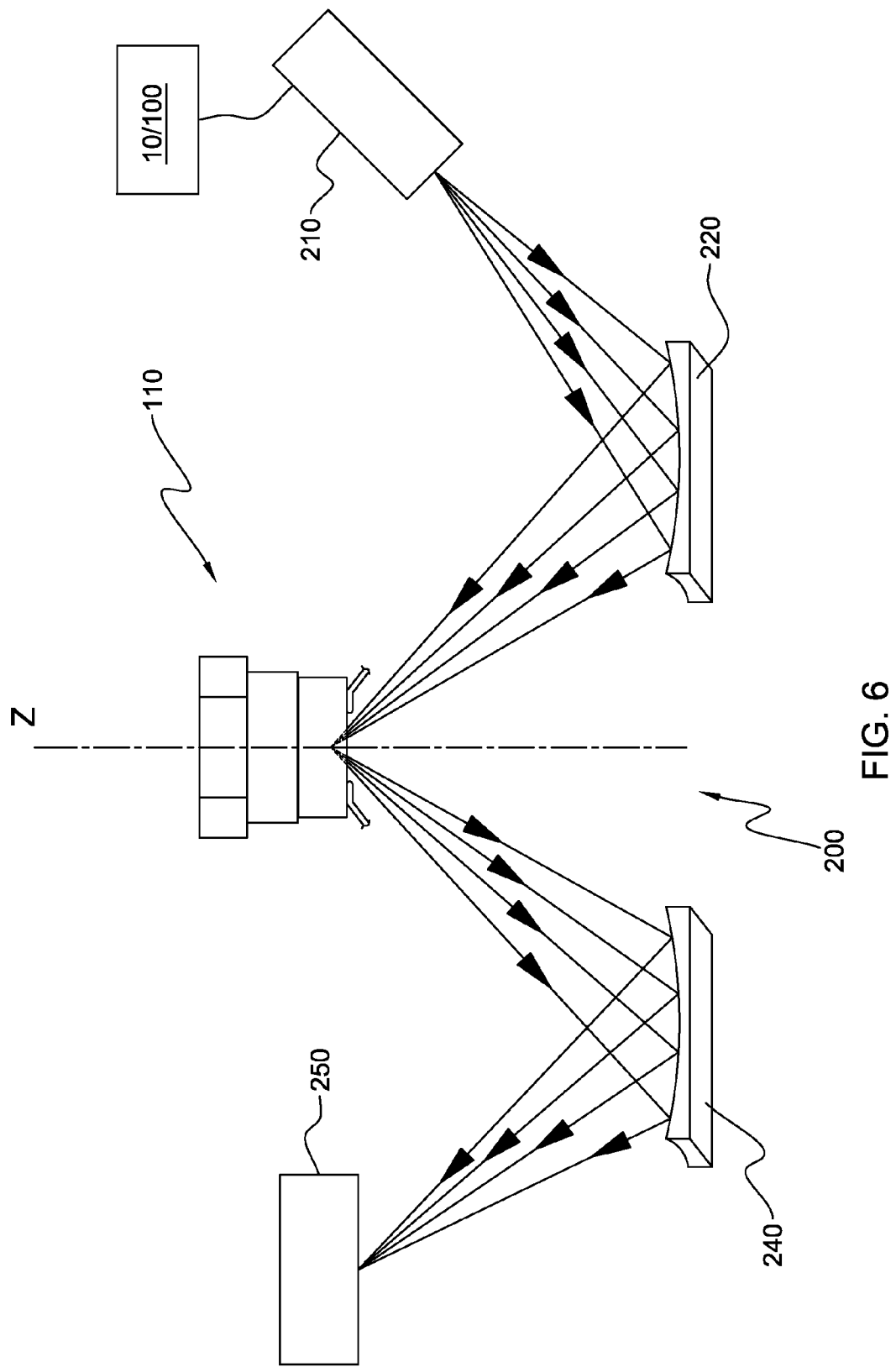
FIG. 6 is a schematic view of an x-ray optic-enabled x-ray analyzer, in combination with a power supply, in accordance with an aspect of the present invention.

Exemplary MWD XRF X-Ray Analysis System:

FIG. 6 depicts in schematic view an exemplary MWD XRF x-ray analysis engine 200 in combination with any of the above-discussed power supply aspects, e.g., 10/100 (or any combination of features thereof). The x-ray analysis engine may have a focal spot requiring alignment with the sample in an exemplary sample cell 110. Engine 200 includes, in one embodiment, an x-ray source 210 (powered by supply 10/100) and detector 250. X-ray optics 220 and/or 240 can be placed in the excitation and/or detection paths of the engine. These optics require a high degree of alignment with the sample spot to function at the requisite limits of detection discussed above. Such optics include, for example, curved crystal monochromating optics such as those disclosed in commonly assigned U.S. Pat. Nos. 6,285,506; 6,317,483; and 7,035,374; and/or multilayer optics such as those disclosed in commonly assigned U.S. patent application entitled "X-Ray Focusing Optic Having Multiple Layers With Respective Crystal Orientations," U.S. Ser. No. 11/941,377 filed Nov. 16, 2007; and/or polycapillary optics such as those disclosed in commonly assigned U.S. Pat. Nos. 5,192,869; 5,175,755; 5,497,008; 5,745,547; 5,570,408; and 5,604,353. Optic/source combinations such as those disclosed in commonly assigned U.S. Pat. Nos. 7,110,506 and 7,209,545 are also useable. Each of the above-noted patents and patent applications is hereby incorporated herein by reference in its entirety.

Curved monochromating optics in the excitation and detection path are shown in FIG. 6, which is the configuration of the SINDIE sulfur analyzer discussed above. However, an optic may only be present in one of these paths, which still requires precise alignment. In one example, an optic of any of the above-describe types may only be present in the excitation path, and the detection path would include an energy dispersive detector. This is the common configuration of an energy dispersive x-ray fluorescence (EDXRF) system.

A low noise power supply 10 can be used in combination with x-ray source 210. As discussed above, the x-ray beam paths and energy levels, and components such as detector 250 may be susceptible to EMI from co-located power supplies. The compact, low noise power supply 10/100 (or any combination of their features) of the present invention minimizes these harmful effects.

Other x-ray, spectroscopy, and general electronic fields may also benefit from such power supplies, where greater than about 10 kV of DV voltage is required in a low noise environment.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A shielded, low-noise, high-voltage power supply, comprising:
   a plurality of voltage multipliers, each having a toroidal transformer, and collectively producing a DC output voltage from an AC voltage;
   a main conductor for carrying the AC voltage, positioned proximate each toroidal transformer of the plurality of voltage multipliers;
   a conductive shell conductively connected to the main conductor, and substantially enclosing the plurality of voltage multipliers and the main conductor, the conductive shell providing a return path for the AC voltage in the main conductor and providing EMI shielding of the voltage multipliers and the main conductor.

2. The power supply of claim 1, further comprising an insulating potting material surrounding the main conductor and the voltage multipliers.

3. The power supply of claim 2, wherein the main conductor is unsheathed.

4. The power supply of claim 1, wherein the main conductor is about ¼ inches in diameter.

5. The power supply of claim 1, further comprising:
   an AC drive circuit for producing the AC voltage; and
   an intermediate transformer, positioned between the AC drive circuit and the main conductor, for conditioning the AC voltage prior to its application to the main conductor, and for isolating the main conductor from the AC drive circuit.

6. The power supply of claim 5, wherein the intermediate transformer is positioned on a board forming part of the conductive shell, and proximate one end of the main conductor.

7. The power supply of claim 1, wherein the conductive shell is grounded.

8. The power supply of claim 1, wherein the conductive shell comprises an exterior housing of the power supply.

9. The power supply of claim 1, wherein the conductive shell comprises a layer positioned inside of an exterior housing of the power supply.

10. An x-ray analysis engine in combination with the power supply of claim 1, the x-ray analysis engine having an x-ray source connected to the power supply.

11. The combination of claim 10, further comprising at least one x-ray optic disposed in an x-ray excitation and/or detection path, requiring alignment to a focal spot.

12. The combination of claim 11, wherein the at least one x-ray optic comprises a curved monochromating optic or a polycapillary optic.

13. The combination of claim 10, comprising a detector which requires EMI shielding from components within the power supply.

* * * * *